US012678867B2

(12) United States Patent
Johnson et al.

(10) Patent No.: US 12,678,867 B2
(45) Date of Patent: Jul. 14, 2026

(54) INJECTION MOLDING TOOL AND A METHOD OF FORMING AN INJECTION MOLDING TOOL

(71) Applicant: Ford Global Technologies, LLC, Dearborn, MI (US)

(72) Inventors: Victor A. Johnson, Royal Oak, MI (US); Bhaskara Rao Pamarthi, Commerce Township, MI (US); Robert A. Chanko, South Lyon, MI (US); Ryan Mowery, Sparta, MI (US); Chad M. Bross, Pickney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 18/620,209

(22) Filed: Mar. 28, 2024

(65) Prior Publication Data

US 2025/0303483 A1     Oct. 2, 2025

(51) Int. Cl.
*B23C 3/28*       (2006.01)
*B29C 45/26*      (2006.01)
(52) U.S. Cl.
CPC ............ *B23C 3/28* (2013.01); *B29C 45/2602* (2013.01)
(58) Field of Classification Search
CPC ........................... B29C 45/372; B29C 33/3878
See application file for complete search history.

(56) References Cited

U.S. PATENT DOCUMENTS

| | | | |
|---|---|---|---|
| 9,315,663 B2 | 4/2016 | Appleby et al. | |
| 11,173,851 B2 | 11/2021 | Preisler et al. | |
| 2019/0389097 A1 | 12/2019 | Heikkila et al. | |
| 2022/0024095 A1 * | 1/2022 | Nakano .................. | B60R 13/02 |
| 2023/0241821 A1 * | 8/2023 | Sayama ................. | B29C 45/56 |
| | | | 264/328.7 |

FOREIGN PATENT DOCUMENTS

JP          2015136819 A  *  7/2015

* cited by examiner

*Primary Examiner* — Virak Nguon
(74) *Attorney, Agent, or Firm* — Burris Law, PLLC

(57) ABSTRACT

A method of forming an injection molding tool, the method includes milling at least one channel into a tool body. Each channel includes a bottom surface that is at a predefined distance from a top surface of the tool body, and two opposing walls extending from the bottom surface of the channel to the top surface of the tool body. A first wall of the two opposing walls is at a first angle relative to the bottom surface of the channel, and a second wall of the two opposing walls is at a second angle relative to the bottom surface of the channel. A distance between the first wall and the second wall increases from the bottom surface of the channel to the top surface of the tool body, and at least one wall of the two opposing walls has a curvature.

20 Claims, 2 Drawing Sheets

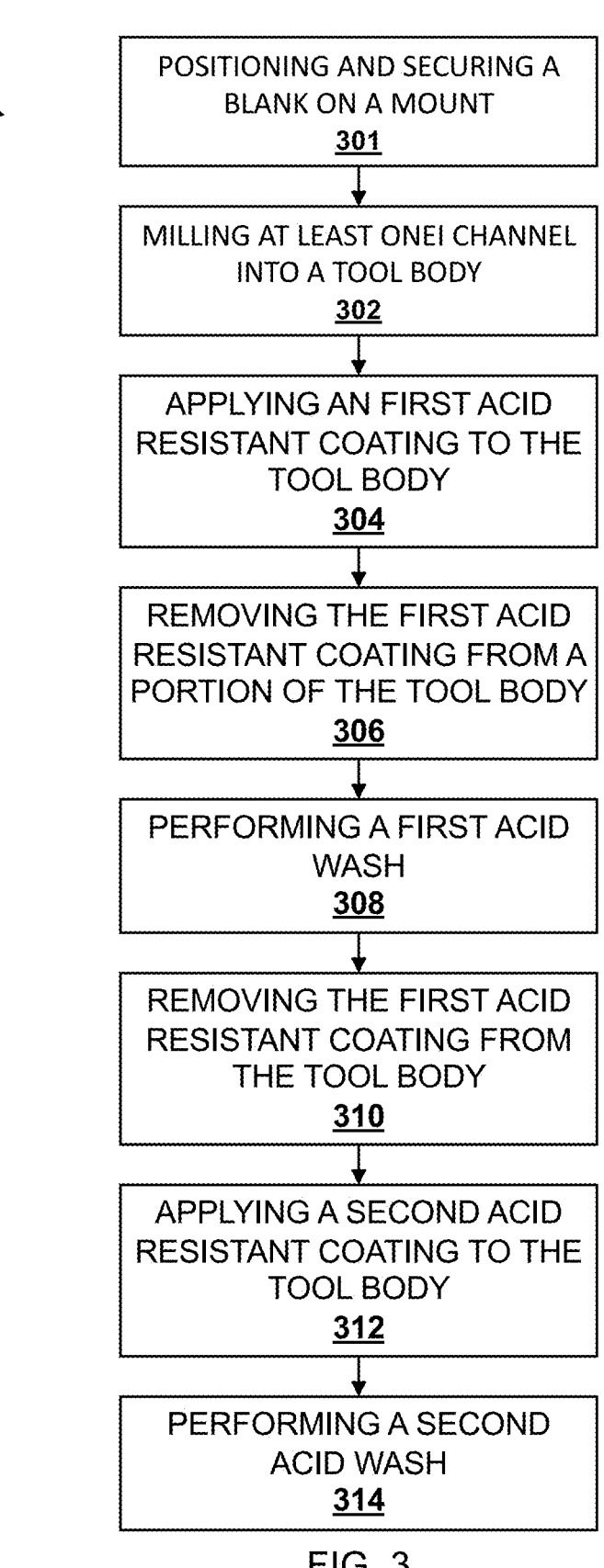

300

POSITIONING AND SECURING A
BLANK ON A MOUNT
301

MILLING AT LEAST ONEI CHANNEL
INTO A TOOL BODY
302

APPLYING AN FIRST ACID
RESISTANT COATING TO THE
TOOL BODY
304

REMOVING THE FIRST ACID
RESISTANT COATING FROM A
PORTION OF THE TOOL BODY
306

PERFORMING A FIRST ACID
WASH
308

REMOVING THE FIRST ACID
RESISTANT COATING FROM
THE TOOL BODY
310

APPLYING A SECOND ACID
RESISTANT COATING TO THE
TOOL BODY
312

PERFORMING A SECOND
ACID WASH
314

FIG. 3

INJECTION MOLDING TOOL AND A METHOD OF FORMING AN INJECTION MOLDING TOOL

FIELD

The present disclosure relates to a method of forming an injection molding tool. More specifically, the present disclosure relates to a method of forming an injection molding tool for an interior vehicle component.

BACKGROUND

The statements in this section merely provide background information related to the present disclosure and may not constitute prior art.

Interior vehicle components are often formed using injection molding technology. Injection molding is a manufacturing process in which a heated material, such as metal, elastomers, confections, thermoplastic polymers, or thermosetting polymers, are injected into a mold through a cavity. The heated material then cools within the mold and retains the configuration set out in the mold. Various aspects of the mold design from the desired shape of the molded part to the material of the mold can affect the surface texture of the vehicle component. Certain mold geometries inhibit material flow in the injection molding process and require additional manufacturing processes, such as a topcoat of paint, to mask the appearance of the surface of the vehicle component. Non-laminar flow properties and cavitation in the forming process may also cause flow lines that disrupt the appearance of the surface. Early solidification and stress of the material may result in a cloudy or blotched appearance of the surface of the vehicle component.

Vehicle components that are formed through injection molding can be acid etched or laser etched to provide a Class A textured surface. Acid etching is the process of chemically cutting a hard surface to create a desired design or texture. An acid resistant coating is applied to a surface to inhibit the acid from etching the metal. A laser removes the acid resistant coating from areas that the design or texture is to be applied. The surface then undergoes an acid wash where acid is applied to the surface for a predetermined amount of time to etch the exposed portions of the surface into the desired design. Acid etching may be ineffective at achieving certain geometries. For example, for certain depths acid etching may undercut the top surface of the vehicle component creating a mushroom appearance rather than a linear pattern.

Laser etching is a process that uses a laser to deliver high amounts of energy to a surface to melt and expand the surface. This results in a depressed mark with a raised surface along the periphery once the surface cools. The laser can be controlled to deliver a desired design or pattern on a surface of a part. Laser etching may also be ineffective at obtaining certain geometries and require a prohibitive amount of time.

These issues related to forming an injection molding tool are addressed by the present disclosure.

SUMMARY

This section provides a general summary of the disclosure and is not a comprehensive disclosure of its full scope or all of its features.

In one form of the present disclosure, a method of forming an injection molding tool includes: positioning a blank on a mount; securing the blank to the mount; milling at least one channel into the blank to form a tool body, each channel including a bottom surface that is at a predefined distance from a top surface of the tool body, the at least one channel further including two opposing walls extending from the bottom surface of the channel to the top surface of the tool body, a first wall of the two opposing walls being at a first angle relative to the bottom surface of the channel, and a second wall of the two opposing walls being at a second angle relative to the bottom surface of the channel, wherein a distance between the first wall and the second wall increases from the bottom surface of the channel to the top surface of the tool body, and wherein at least one wall of the two opposing walls has a curvature.

In variations of this method, which may be implemented individually or in combination: the curvature of the at least one wall of the two opposing walls is tangent to the bottom surface of the channel, and wherein the curvature of the at least one wall of the two opposing walls has a radius between of 0.2 mm and 0.5 mm; the curvature of the at least one wall of the two opposing walls is tangent to the top surface of the tool body, and wherein the curvature of the at least one wall of the two opposing walls has a radius between of 0.25 mm and 0.5 mm; the predefined distance between the bottom surface of the channel and the top surface of the tool body is between 0.45 and 0.55 mm; the first angle of the first wall is between 50 and 60 degrees relative to the bottom surface of the channel; the second angle of the second wall is between 35 and 45 degrees relative to the bottom surface of the channel; the distance between the first wall and the second wall at the bottom surface is between 0.5 mm and 0.6 mm; the at least one channel includes at least two channels, and wherein the distance between the second wall of a first channel and the first wall of a second channel at the top surface of the tool body is between 2 mm and 3 mm; applying a first acid resistant coating to the tool body; removing the first acid resistant coating from a portion of the tool body; performing a first acid wash; removing the first acid resistant coating from the tool body; and performing a second acid wash; and the portion of the tool body is the at least one channel in the tool body.

In one form of the present disclosure a tool for injection molding includes: at least one milled channel including: a bottom surface that is at a predefined distance from a top surface of the tool; and two opposing walls extending from the bottom surface of the channel to the top surface of the tool, a first wall of the two opposing walls being at a first angle relative to the bottom surface of the channel, and a second wall of the two opposing walls being at a second angle relative to the bottom surface of the channel, wherein a distance between the first wall and the second wall increases from the bottom surface of the channel to the top surface of the tool, and wherein at least one wall of the two opposing walls has a curvature.

In variations of this tool, which may be implemented individually or in combination: the curvature of the at least one wall of the two opposing walls is tangent to the bottom surface of the channel, and wherein the curvature of the at least one wall of the two opposing walls has a radius between of 0.2 mm and 0.5 mm; the curvature of the at least one wall of the two opposing walls is tangent to the top surface of the tool, and wherein the curvature of the at least one wall of the two opposing walls has a radius between of 0.2 mm and 0.5 mm; the predefined distance between the bottom surface of the channel and the top surface of the tool is between 0.45 and 0.55 mm; the first angle of the first wall is between 50 and 60 degrees relative to the bottom surface of the channel; the second angle of the second wall is between 35 and 45 degrees relative to the bottom surface of the channel; the distance between the first wall and the second wall at the bottom surface is between 0.5 mm and 0.6 mm; and the at least one channel includes at least two channels, and wherein the distance between the second wall of a first channel and the first wall of a second channel at the top surface of the tool is between 2 mm and 3 mm.

In another form of the present disclosure, a method of forming an injection molding tool includes: positioning a blank on a mount; securing the blank to the mount; milling at least one channel into the blank to form a tool body, each channel including a bottom surface that is between 0.45 and 0.55 mm from a top surface of the tool body, the at least one channel further including two opposing walls extending from the bottom surface of the channel to the top surface of the tool body, a first wall of the two opposing walls being at an angle between 50 and 60 degrees relative to the bottom surface of the channel, and a second wall of the two opposing walls being at an angle between 35 and 45 degrees relative to the bottom surface of the channel, wherein a distance between the first wall and the second wall increases from the bottom surface of the channel to the top surface of the tool body, the distance between the first wall and the second wall at the bottom surface is between 0.5 mm and 0.6 mm, and wherein at least one wall of the two opposing walls includes a first radius that is tangent to the top surface of the tool body and a second radius that is tangent to the bottom surface of the channel the first radius and the second radius are between 0.2 and 0.5 mm.

In variations of this method, which may be implemented individually or in combination: the method further includes applying a first acid resistant coating to the tool body; removing the first acid resistant coating from the at least one channel of the tool body; performing a first acid wash; removing the first acid resistant coating from the tool body; and performing a second acid wash.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a flow diagram illustrating a method of forming an injection molding tool according to one form of the present disclosure.

Figure 1:
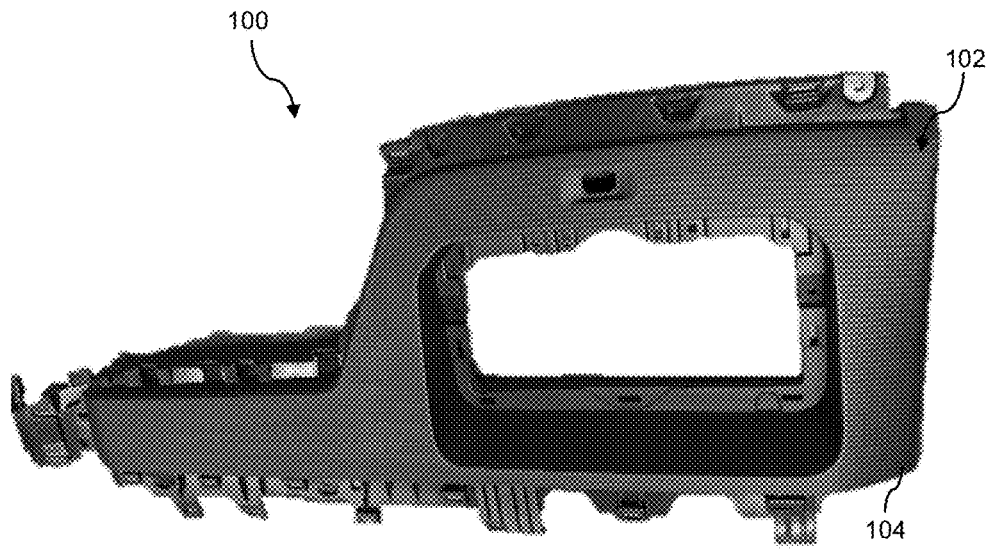
FIG. 1 depicts a perspective view of a vehicle component according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a vehicle component 100 formed from injection molding includes a textured surface 102. In one form, the vehicle component 100 is a facade for an instrument panel of a vehicle (not shown). However, it is understood that the vehicle component 100 may be any component within the vehicle that a user may interact with. The vehicle component 100 has a Class A surface 102. The Class A surface 102 is a surface that the user can touch and see. In one form, the Class A surface 102 is a textured surface that has a rib pattern design with a plurality of cavities 104. The plurality of cavities 104 provide a complex three-dimensional pattern that is shaped to appear linear from any viewing angle in the entirety of the length of the vehicle component 100. Additionally, each cavity 104 of the plurality of cavities 104 is shaped to allow for foreign particle removal using conventional means (e.g. spraying, wiping, etc.) from the Class A surface 102.

Figure 2:
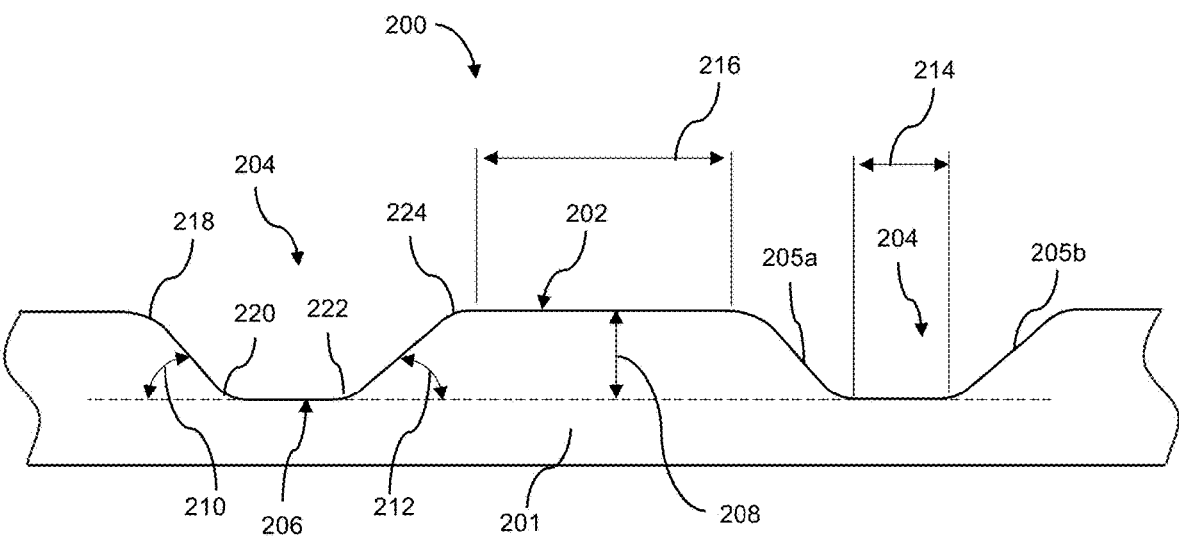
FIG. 2 depicts a schematic representation of a geometry of a tool for injection molding a vehicle component according to one form of the present disclosure.

Referring to FIG. 2, an enlarged view of a portion of an injection molding tool 200 for molding the vehicle component 100 is provided. In one form, the injection molding tool 200 is a mold in which a heated material (e.g. metal, elastomers, confections, thermoplastic polymers, thermosetting polymers, etc.) is injected during an injection molding process. The injection molding tool 200 may be formed from a metallic material. In one form the injection molding tool 200 is formed from various tool steels.

The injection molding tool 200 includes a tool body 201 that defines a top surface 202. A multi-axis milling machine is used to mill at least one channel 204 into the top surface 202 of the tool body 201. While two channels 204 are depicted in FIG. 2, it is understood that the injection molding tool 200 may include any number of channels 204 so as to cover a portion of the Class A surface 102 of a vehicle component 100 as desired. In a particular form, the portion of the Class A surface 102 of a vehicle component 100 is entirety of the Class A surface 102. The at least one channel 204 is shaped to facilitate molding through injection molding. As such, the shape of the at least one channel 204 facilitates material flow in a non-turbulent manner by flowing linear to the grain pattern.

Each channel 204 includes a bottom surface 206 that is spaced at a predefined distance 208 from the top surface 202 of the tool body 201. In certain forms the predefined distance 208 between the bottom surface 206 of the channel 204 and the top surface 202 of the tool body 201 is between 0.45 mm and 0.55 mm. In one variation the predefined distance 208 is 0.5 mm.

Each channel 204 includes two opposing walls 205a, 205b extending from the bottom surface 206 of the channel 204 to the top surface 202 of the tool body 201. The first wall 205a of the two opposing walls 205a, 205b is at a first angle 210 relative to the bottom surface 206 of the channel 204. In one form the first angle 210 between the first wall 205a and the bottom surface 206 of the channel 204 is between 50 degrees to 60 degrees. In one form the first angle 210 of the first wall 205a is 54 degrees relative to the bottom surface 206 of the channel 204. The second wall 205b of the two opposing walls 205a, 205b is at a second angle 212 relative to the bottom surface 206 of the channel 204. In one form the second angle 212 between the second wall 205b and the bottom surface 206 of the channel 204 is between 35 degrees and 45 degrees. In some forms the second angle 212 of the second wall 205b is 39 degrees relative to the bottom surface 206 of the channel 204.

As shown, the distance 214 between the first wall 205*a* and the second wall 205*b* increases from the bottom surface 206 of the channel 204 to the top surface 202 of the tool body 201. In one form the distance 214 between the first wall 205*a* and the second wall 205*b* at the bottom surface 206 of the channel 204 is between 0.5 mm and 0.6 mm. In one variation the distance 214 is 0.5 mm.

At least one of the walls 205*a*, 205*b* of the two opposing walls 205*a*, 205*b* has a curvature 218, 220, 222, 224. In one form the curvature 220, 222 of the at least one wall 205*a*, 205*b* of the two opposing walls 205*a*, 205*b* is tangent to the bottom surface 206 of the channel 204. In certain forms the curvature 220, 222 of the at least one wall 205*a*, 205*b* of the two opposing walls 205*a*, 205*b* has a radius between 0.2 mm and 0.5 mm. In particular forms the radius of the curvature 220 of the first wall 205*a* is greater than the radius of the curvature 222 of the second wall 205*b*. In another form the radius of the curvature 220 of the first wall 205*a* is less than the radius of the curvature 222 of the second wall 205*b*, for example, the curvature 220 is 0.25 mm and the curvature 222 is 0.375 mm. In still yet another form, the radius of the curvature 220 of the first wall 205*a* is equal to the radius of the curvature 222 of the second wall 205*b*.

In another form the curvature 218, 224 of the at least one wall 205*a*, 205*b* of the two opposing walls 205*a*, 205*b* is tangent to the top surface 202 of the tool body 201. In a particular form the curvature 218, 224 of the at least one wall 205*a*, 205*b* of the two opposing walls 205*a*, 205*b* has a radius between 0.2 mm and 0.5 mm. In one form the radius of the curvature 218 of the first wall 205*a* is greater than the radius of the curvature 224 of the second wall 205*b*. In another form the radius of the curvature 218 of the first wall 205*a* is less than the radius of the curvature 224 of the second wall 205*b*. In still yet another form, the radius of the curvature 220 of the first wall 205*a* is equal to the radius of the curvature 222 of the second wall 205*b*, for example the radius of the curvature 218, 224 is 0.25 mm.

When there are at least two channels 204, the two channels 204 cooperate to form the ribbed pattern design on the Class A surface 102 of the vehicle component 100. The second wall 205*b* of a first channel 204 of the at least two channels 204 and the first wall 205*a* of a second channel 204 define the top surface 202 of the tool body 201. As such, the top surface 202 defines the cavity 104 of the Class A surface 102 of the vehicle component 100 and the channel 204 defines the raised portions between the cavities 104 of the Class A surface 102 of the vehicle component 100. A distance 216 between the second wall 205*b* of the first channel 204 and the first wall 205*a* of the second channel 204 at the top surface 202 of the tool body 201 is between 2 mm and 3 mm. In certain forms the distance 216 is 2 mm.

Referring to FIG. 3, a flowchart of a process 300 for forming an injection molding tool 200 is shown. Step 301 includes positioning a blank on a mount and securing the blank to the mount. In step 302 a multi-axis milling machine is utilized to mill at least one channel 204 into the top surface 202 of the blank to form the tool body 201. The at least one channel 204 is contoured to appear straight from any viewing angle. The predefined distance 208 between the top surface 202 of the tool body 201 and the bottom surface 206 of the at least one channel 204 is also adjusted throughout the body of the injection molding tool 200 so that the raised portions between the cavities 104 appear straight throughout the Class A surface 102 of the vehicle component 100.

In step 304 a first acid resist coating is applied to the tool body 201. In one form, the first acid resist coating is applied to the top surface 202 of the tool body 201. In another form, the first acid resist coating is applied to the top surface 202 of the tool body 201 and the surface of the at least one channel 204. The first acid resist coating may be any material that actively resists the erosion of acid. In one form the first acid resist coating is formed from at least one of wax and paint. The first acid resist coating may be applied to the tool body 201 using conventional means (e.g. spray, paint, lamination, etc.).

The first acid resist coating is then removed from a portion of the tool body 201 in step 306. In one form the portion of the tool body 201 is the at least one channel 204 in the tool body 201. The first acid resist coating may be removed using conventional methods such as with a laser. It I understood that other conventional methods for removing the first acid resist coating from the tool body 201 may also be used and be within the scope of the present disclosure. Applying the first acid resist coating to the top surface 202 of the tool body 201 results in the acid etching of the channels 204 of the tool body 201 that do not have the first acid resist coating. This results in the texture from the first acid wash being applied to the raised portions between the cavities 104 of the vehicle component 100.

Once the first acid resist coating is applied to the intended areas of the tool body 201, a first acid wash of the tool body 201 is performed in step 308. The acid of the first acid wash may be any conventional acid used in acid etching. In one form the acid of the first acid wash is Nitric Acid. The first acid wash may be performed using any conventional acid wash techniques such as an acid bath or an acid spray. In one form the acid from the first acid wash remains on the vehicle component less than 30 minutes. The first acid wash results in a textured surface being applied to the at least one channel 204 of the tool body 201, which results in a textured surface of the raised portions between the cavities 104 of the vehicle component 100. In one form the textured surface from the first acid wash is a vapor hone surface or a sand blast surface. It is understood that other textured surface may result from the first acid wash and still be within the scope of this disclosure.

Once the first acid wash is complete the first acid resistant coating is removed from the tool body 201 in step 310. The first acid resist coating may be removed using conventional methods such as, for example, with a laser. It I understood that other conventional methods for removing the first acid resist coating from the tool body 201 may also be utilized and be within the scope of the present disclosure. In one form, a second acid resistant coating is then applied to portions of the tool body 201 in step 312. The second acid resist coating may be any conventional material that actively resists the erosion of acid and may be applied to the tool body 201 using conventional means (e.g. spray, paint, lamination, etc.). In a particular form, the second acid resistant coating is applied to the at least one channel 204 of the tool body 201. Additionally, in another form, step 312 is skipped such that a second acid resistant coating is not applied to the tool body 201.

In step 314, a second acid wash of the tool body 201 is performed. The acid of the second acid wash may be any conventional acid used in acid etching. In one form the acid of the second acid wash is Nitric Acid. The second acid wash may be performed using any conventional acid wash techniques such as, for example, an acid bath or an acid spray. In one form the acid from the second acid wash remains on the vehicle component less than 20 minutes. In one form, the second acid wash results in a textured surface being applied to the top surface 202 of the tool body 201, which results in a textured surface of the cavities 104 of the vehicle component 100. In another form the second acid wash results in a textured surface being applied to the top surface 202 and the previously textured surface of the at least one channel 204 of the tool body 201. In a particular form the textured surface from the first acid wash results in a vapor hone surface or a sand blast surface of the at least one channel 204 and a velvet etch grain surface on the top surface 202 of the tool body 201. It is understood that other textured surface may result from the first acid wash and still be within the scope of this disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming an injection molding tool, the method comprising:
    positioning a blank on a mount;
    securing the blank to the mount;
    milling at least one channel into the blank to form a tool body, each channel including a bottom surface that is at a predefined distance from a top surface of the tool body, the at least one channel further including two opposing walls extending from the bottom surface of the channel to the top surface of the tool body, a first wall of the two opposing walls being at a first angle relative to the bottom surface of the channel, and a second wall of the two opposing walls being at a second angle relative to the bottom surface of the channel, wherein a distance between the first wall and the second wall increases from the bottom surface of the channel to the top surface of the tool body, and wherein at least one wall of the two opposing walls has a curvature.

2. The method of claim 1, wherein the curvature of the at least one wall of the two opposing walls is tangent to the bottom surface of the channel, and wherein the curvature of the at least one wall of the two opposing walls has a radius between of 0.2 mm and 0.5 mm.

3. The method of claim 1, wherein the curvature of the at least one wall of the two opposing walls is tangent to the top surface of the tool body, and wherein the curvature of the at least one wall of the two opposing walls has a radius between of 0.25 mm and 0.5 mm.

4. The method of claim 1, wherein the predefined distance between the bottom surface of the channel and the top surface of the tool body is between 0.45 and 0.55 mm.

5. The method of claim 1, wherein the first angle of the first wall is between 50 and 60 degrees relative to the bottom surface of the channel.

6. The method of claim 1, wherein the second angle of the second wall is between 35 and 45 degrees relative to the bottom surface of the channel.

7. The method of claim 1, wherein the distance between the first wall and the second wall at the bottom surface is between 0.5 mm and 0.6 mm.

8. The method of claim 1, wherein the at least one channel tool body includes at least two channels, and wherein the distance between the second wall of a first channel and the first wall of a second channel at the top surface of the tool body is between 2 mm and 3 mm.

9. The method of claim 1, further comprising:
    applying a first acid resistant coating to the tool body;
    removing the first acid resistant coating from a portion of the tool body;
    performing a first acid wash;
    removing the first acid resistant coating from the tool body; and
    performing a second acid wash.

10. The method of claim 9, wherein the portion of the tool body is the at least one channel in the tool body.

11. A tool for injection molding, the tool comprising:
    at least one milled channel including;
        a bottom surface that is at a predefined distance from a top surface of the tool; and
        two opposing walls extending from the bottom surface of the channel to the top surface of the tool, a first wall of the two opposing walls being at a first angle relative to the bottom surface of the channel, and a second wall of the two opposing walls being at a second angle relative to the bottom surface of the channel,
    wherein a distance between the first wall and the second wall increases from the bottom surface of the channel to the top surface of the tool, and wherein at least one wall of the two opposing walls has a curvature.

12. The tool of claim 11, wherein the curvature of the at least one wall of the two opposing walls is tangent to the bottom surface of the channel, and wherein the curvature of the at least one wall of the two opposing walls has a radius between of 0.2 mm and 0.5 mm.

13. The tool of claim 11, wherein the curvature of the at least one wall of the two opposing walls is tangent to the top surface of the tool, and wherein the curvature of the at least one wall of the two opposing walls has a radius between of 0.2 mm and 0.5 mm.

14. The tool of claim 11, wherein the predefined distance between the bottom surface of the channel and the top surface of the tool is between 0.45 and 0.55 mm.

15. The tool of claim 11, wherein the first angle of the first wall is between 50 and 60 degrees relative to the bottom surface of the channel.

16. The tool of claim 11, wherein the second angle of the second wall is 35 and 45 degrees relative to the bottom surface of the channel.

17. The tool of claim 11, wherein the distance between the first wall and the second wall at the bottom surface is between 0.5 mm and 0.6 mm.

18. The tool of claim 11, wherein the at least one channel includes at least two channels, and wherein the distance between the second wall of a first channel and the first wall of a second channel at the top surface of the tool is between 2 mm and 3 mm.

19. A method of forming an injection molding tool, the method comprising:

positioning a blank on a mount;

securing the blank to the mount;

milling at least one channel into the blank to form a tool body, each channel including a bottom surface that is between 0.45 and 0.55 mm from a top surface of the tool body, the at least one channel further including two opposing walls extending from the bottom surface of the channel to the top surface of the tool body, a first wall of the two opposing walls being at an angle between 50 and 60 degrees relative to the bottom surface of the channel, and a second wall of the two opposing walls being at an angle between 35 and 45 degrees relative to the bottom surface of the channel, wherein a distance between the first wall and the second wall increases from the bottom surface of the channel to the top surface of the tool body, the distance between the first wall and the second wall at the bottom surface is between 0.5 mm and 0.6 mm, and wherein at least one wall of the two opposing walls includes a first radius that is tangent to the top surface of the tool body and a second radius that is tangent to the bottom surface of the channel the first radius and the second radius are between 0.2 and 0.5 mm.

20. The method of claim 19, further comprising:

applying a first acid resistant coating to the tool body;

removing the first acid resistant coating from the at least one channel of the tool body;

performing a first acid wash;

removing the first acid resistant coating from the tool body; and performing a second acid wash.

\* \* \* \* \*